UNITED STATES PATENT OFFICE.

JOHN F. SMITH, OF SEATTLE, WASHINGTON, ASSIGNOR OF ONE-HALF TO CATHERINE M. HEMEN, OF SEATTLE, WASHINGTON, AND ONE-FOURTH TO HENRY B. BURKHART, OF SEATTLE, WASHINGTON.

PROCESS OF COATING THE VALVES, CYLINDERS, &c., OF GAS-ENGINES AND THE LIKE.

1,292,903. Specification of Letters Patent. Patented Jan. 28, 1919.

No Drawing. Application filed December 14, 1915. Serial No. 66,751.

*To all whom it may concern:*

Be it known that I, JOHN F. SMITH, a citizen of the United States, and a resident of Seattle, in the county of King and State of Washington, have invented certain new and useful Improvements in Processes of Coating the Valves, Cylinders, &c., of Gas-Engines and the like, of which the following is a specification.

My invention relates to the process of coating the valves and inside of the cylinders of a gas engine with a thin and smooth metallic skin or coating for the purpose of filling pit holes and inequalities in the surfaces of the metal; for the purpose of resizing the piston, cylinders and valves; and for the purpose of removing and preventing the incrustation of carbon on the cylinder, piston, etc., and prevent lodgment of another coat of carbon. The metallic coating is applied in my process while the engine is running and therein differs from the usual plating and spraying processes. My process consists of mixing zinc oxid and sal ammoniac in the proportions of about two ounces of the former and one ounce of the latter a small quantity of Venetian red, one-third ounce of aqua ammonia and one gallon of water. The above mixture is agitated and placed in a large spouted squirt can or the like, the engine is started rather slowly and after becoming warmed up, the spout of the can is inserted in the auxiliary air valve on the engine. The mixture may be started flowing by squirting, after which the suction of the engine will draw it from the can sufficiently fast as it should be admitted to the engine slowly. It is believed that the action of the zinc and sal ammoniac (ammonium chlorid) forms in the presence of water, a double chlorid of zinc and ammonia which has a well known action of cleaning and brightening metal. The chemical action of depositing and the composition of the deposit on the walls of the cylinder, etc., is not well understood as the action of sal ammoniac in the presence of metals varies greatly under different conditions. The advantages of coating the cylinder, piston, valves, etc., of an engine by this simple process, will be apparent when it is understood that the coat compensates for wear, is smooth and bright, resists the depositing of carbon, and takes up inequalities in the surfaces, and causes the engine to pick up and give more power than previous to application due to removing friction.

What I claim is—

1. The process of cleaning the cylinder, valves and piston of an internal combustion engine by the slow introduction of a mixture of sal ammoniac, zinc oxid and water into said cylinder while the engine is running.

2. The process of cleaning and coating the combustion chamber, valves, piston, etc., of an internal combustion engine by the slow introduction of a mixture of two ounces zinc oxid, one ounce sal ammoniac, one-third ounce ammonia and one gallon of water, into the said combustion chamber through the auxiliary air valve of said engine while said engine is running.

3. A composition of matter suitable for removing carbon from engine cylinders and parts thereof, said composition comprising about two parts of zinc oxid, about one part sal ammoniac and about 128 parts of water, substantially as described.

JOHN F. SMITH.